Figure 1:
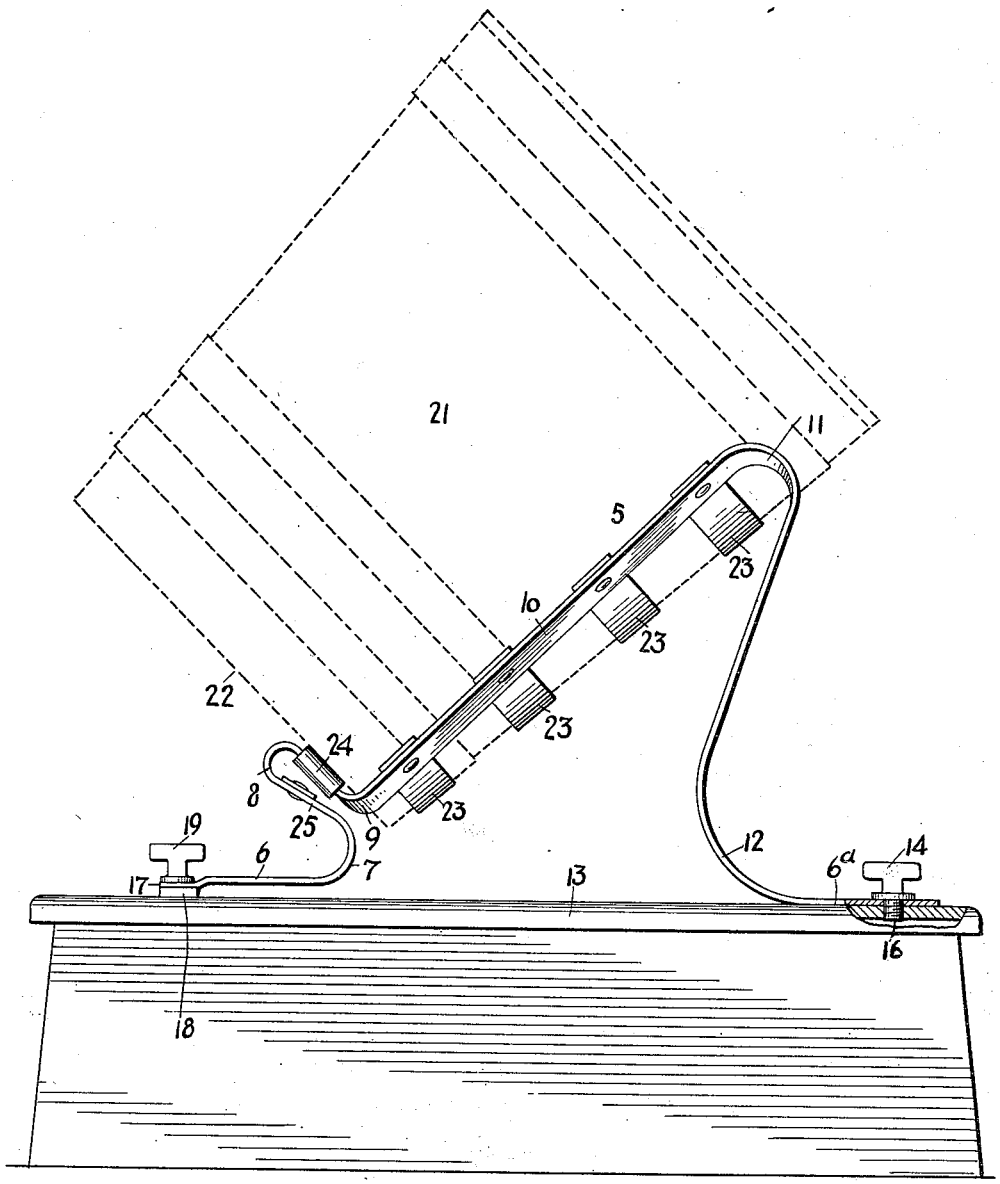

F. D. SHEA.
ATTACHMENT FOR SCALES.
APPLICATION FILED NOV. 11, 1912.

1,070,295.

Patented Aug. 12, 1913.
2 SHEETS—SHEET 1.

WITNESSES

INVENTOR
FRANK D. SHEA,
BY
ATTORNEYS

F. D. SHEA.
ATTACHMENT FOR SCALES.
APPLICATION FILED NOV. 11, 1912.
1,070,295.
Patented Aug. 12, 1913.
2 SHEETS—SHEET 2.
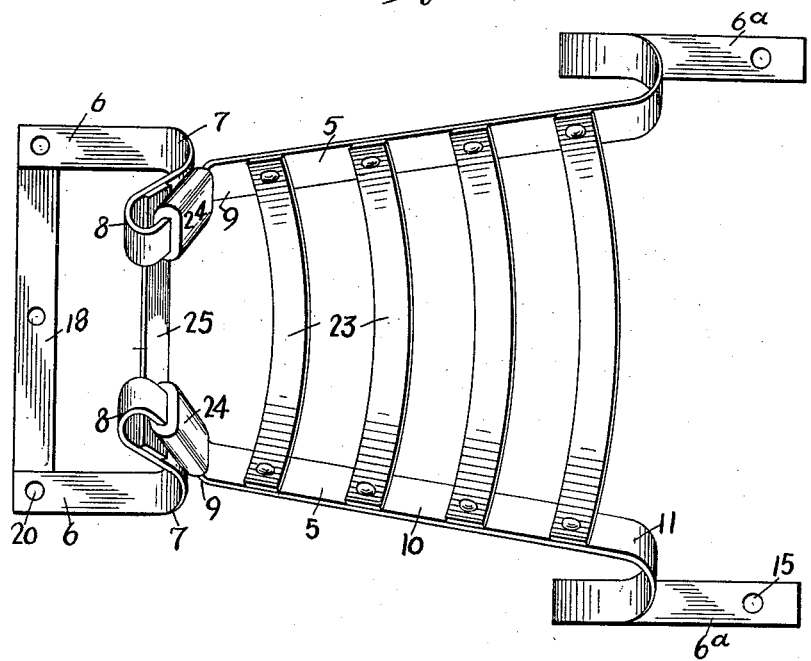
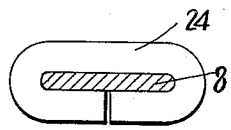
WITNESSES
INVENTOR
FRANK D. SHEA,
BY
ATTORNEYS

UNITED STATES PATENT OFFICE.

FRANK D. SHEA, OF NEW YORK, N. Y.

ATTACHMENT FOR SCALES.

1,070,295.  Specification of Letters Patent.  Patented Aug. 12, 1913.

Application filed November 11, 1912. Serial No. 730,623.

*To all whom it may concern:*

Be it known that I, FRANK D. SHEA, a citizen of the United States, and a resident of the city of New York, borough of Manhattan, in the county and State of New York, have invented a new and Improved Attachment for Scales, of which the following is a full, clear, and exact description.

My invention has for its object to provide an attachment for scales, which may be disposed on a scale platform, and which will assist in weighing tubs of butter, and other similar articles.

My attachment is resilient, so that when a tub of butter is quickly placed thereon my attachment will take up or absorb most of the shock, thereby relieving the scale of this jar, and making it possible to ascertain more quickly the weight of the tub of butter. The attachment will also make certain that each tub of butter will be disposed in substantially the same position relatively to the scale platform, so that all the tubs of butter will be weighed under the same conditions. My attachment will also hold the tubs of butter at an angle, and with one side of the tub disposed in a position where the weight may be quickly marked thereon, when the weight has been ascertained.

Additional objects of the invention will appear in the following complete specification, in which the preferred form of the invention is disclosed.

In the drawings similar characters of reference indicate corresponding parts in all the views, in which—

Figure 1 is a side elevation of my attachment, mounted on a scale platform, with parts broken away, to show the means for securing my attachment in place; Fig. 2 is a plan view of my attachment; and Fig. 3 is a sectional fragmentary view showing how the rubber members are mounted on the loop portions of my attachment.

With my attachment the weighing of commodities in tubs is greatly simplified, as all unnecessary movements of the tub are eliminated. In weighing butter or other similar commodities, it is customary for the weigher to cant the tub over before lifting it. With my device the tub is accommodated, and is weighed in this position; this position is also the desired one for marking the weight on the side of the tub, and after the weighing is completed the tub is in the best position to be lifted from the scale.

Spring scales are ordinarily considered too delicate for use in weighing tubs of butter, which weigh from seventy to seventy-five pounds, but with my device fastened to the platform of a spring scale, the shock is absorbed by the resilient members in my device, which eases the spring of the scale, and makes it possible to weigh the tubs quickly with spring scales.

By referring to the drawings it will be seen that my device is constructed with two members 5, which are disposed side by side, and which have foot portions 6 and $6^a$, at their ends. The members 5 from their ends 6 are bent upward at 7, and then are looped backward at 8, to the point 9, the members 5 then being continued as at 10 upward and obliquely relatively to the position of the feet 6, the member 5 being again bent downward and slightly backward at the point 11, and then again forward at 12, to the feet $6^a$. These feet $6^a$ are disposed on the platform scale 13, and the screw members 14 are disposed through the orifices 15 in the feet members $6^a$, these screw members 14 meshing with threaded orifices 16 in the platform 13. The terminals 17 of the feet 6 are disposed on blocks 18, and the screws 19 are disposed through the orifices 20, and through orifices in the block, the threaded portion of the screws 19 meshing in the threaded orifices in the scale platform 13, in the same manner as the threaded portion of the screws 14 mesh in the threaded orifices 16 of the said scale platform. It will be seen that with this construction there is considerable resiliency at the looped portions 8, so that when the bottom 22 of the hub 21 is supported by these looped portions 8, the resiliency of the looped portions, and the bent portions 7 of the members 5, will absorb the shock and jar. The members 5 are connected together by the curved transverse members 23, which serve to support the under side of the tub 21. Resilient members 24 are mounted on looped portions 8 of the members 5, so that the bottom 22 of the tub 21 will rest on these resilient members. The looped portions 8 of the members 5 are connected by a transverse member 25, which holds the looped portions 8 of the members 5 spaced apart at a predetermined distance from each other.

Having thus described my invention, I claim as new and desire to secure by Letters Patent:

1. In an attachment for scales, two resilient members, the ends of the resilient members being bent downward and having foot members, one set of ends of the resilient members being longer than the other set of ends, so that the central portions of the resilient members will be disposed obliquely relatively to a line extending from one set of foot members to the other set of foot members.

2. In an attachment for scales, two resilient members, the ends of the resilient members being bent downward and having foot members, one set of ends of the resilient members being longer than the other set of ends, so that the central portions of the resilient members will be disposed obliquely relatively to a line extending from one set of foot members to the other set of foot members, and curved transverse members connecting the resilient members at their central portions.

3. In an attachment for scales, two companion members disposed side by side, and having feet at their ends, the members from corresponding ends being bent up and looped back, the members then extending from the looped portions obliquely relatively to and away from the last-mentioned ends, and then down to their other ends.

4. In an attachment for scales, two resilient companion members disposed side by side and having feet at their ends, the members from corresponding ends being bent up and looped back, the members then extending from the looped portions obliquely relatively to and away from the last-mentioned ends, and then down to their feet at their other ends.

5. In an attachment for scales, two members disposed side by side, and having feet at their ends, the members being bent up and looped back, the members then extending from the looped portions obliquely relatively to and away from the last-mentioned ends, and then down to their feet at their other ends, and resilient members mounted on the looped portions of the first-mentioned members.

6. In an attachment for scales, two resilient members having feet at their ends, the members from corresponding ends being bent up and looped back, the members then extending from the looped portions obliquely relatively to and away from the last-mentioned ends, and then down to their feet at their other ends, and resilient members supported by the looped portions of the first-mentioned members.

7. In combination with a scale platform, two resilient members having horizontally disposed feet at one set of ends, the members being bent up and looped back from the said feet, the members then extending from the looped portions obliquely relatively to and away from the feet, the members then being looped and extending downward and slightly backward and then again forward, forming two additional horizontally disposed feet, means for supporting the terminals of the members at the first-mentioned feet, and transverse members connecting the two members.

8. In an attachment for scales, two resilient members having feet at their ends, the members from corresponding ends being bent up and looped back, the members then extending from the looped portions obliquely relatively to and away from the last-mentioned feet and then down to their other set of feet, and a member connecting the two resilient members.

9. In an attachment for scales, two members having feet at their ends, the members from one set of ends being bent up and looped back, the members then extending from the looped portions obliquely relatively to and away from the last-mentioned feet and then down to their other set of feet, resilient members mounted on the looped portions of the first-mentioned members, and means connecting the first-two-mentioned members.

10. In an attachment for scales, a resilient member having feet at its ends, the member from one set of ends being bent up and looped back, the member then extending from the looped portion obliquely relatively to and away from its last-mentioned foot, and then down to its other foot.

In testimony whereof I have signed my name to this specification in the presence of two subscribing witnesses.

FRANK D. SHEA.

Witnesses:
EVERARD B. MARSHALL,
PHILIP D. ROLLHAUS.

Copies of this patent may be obtained for five cents each, by addressing the "Commissioner of Patents, Washington, D. C."